United States Patent
Aas et al.

(10) Patent No.: US 8,890,457 B2
(45) Date of Patent: Nov. 18, 2014

(54) SYSTEMS AND METHODS FOR CONTROLLING MOTORS

(75) Inventors: Eric F. Aas, Windsor, CO (US); Justin Forrester, Fort Collins, CO (US); Jeffrey D. Schwartz, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1714 days.

(21) Appl. No.: 12/234,345

(22) Filed: Sep. 19, 2008

(65) Prior Publication Data
US 2010/0072935 A1 Mar. 25, 2010

(51) Int. Cl.
*G05B 19/18* (2006.01)
*G05B 19/40* (2006.01)

(52) U.S. Cl.
CPC ...... *G05B 19/40* (2013.01); *G05B 2219/42177* (2013.01)
USPC ............................. 318/567; 318/257; 318/264

(58) Field of Classification Search
USPC ......... 396/48; 318/567, 568.1, 255, 256, 257, 318/264–266, 268, 272, 280, 286, 287, 291, 318/293
See application file for complete search history.

(56) References Cited

U.S. PATENT DOCUMENTS

| | | | | |
|---|---|---|---|---|
| 4,099,109 A | * | 7/1978 | Abbondanti | 318/811 |
| 4,237,502 A | * | 12/1980 | Erickson et al. | 360/78.07 |
| 4,481,456 A | * | 11/1984 | Meyerand et al. | 318/800 |
| 4,671,635 A | * | 6/1987 | Ohara et al. | 396/410 |
| 4,698,744 A | * | 10/1987 | Itani et al. | 700/12 |
| 4,758,938 A | * | 7/1988 | Kanazawa | 363/41 |
| 4,860,186 A | * | 8/1989 | Maekawa et al. | 363/41 |
| 5,049,909 A | * | 9/1991 | Ishikawa et al. | 396/406 |
| 5,148,200 A | * | 9/1992 | Takahashi et al. | 396/76 |
| 5,274,416 A | * | 12/1993 | Kawasaki et al. | 396/91 |
| 7,112,937 B1 | | 9/2006 | Stemple et al. | |

* cited by examiner

*Primary Examiner* — Bentsu Ro (57) ABSTRACT

Systems and methods for controlling motors are provided. In this regard, a representative system, among others, includes memory, a motor controller, and a motor. The memory is configured to store sequence information and the motor controller is configured to: receive instructions from a processing device of the system, receive the stored sequence information based on the received instructions, generate at least one drive signal based on the received sequence information, and transmit the at least one drive signal. The motor is configured to be operated based on the transmitted drive signal.

20 Claims, 5 Drawing Sheets

SYSTEMS AND METHODS FOR CONTROLLING MOTORS

BACKGROUND

Typically, a motor can be controlled by turning on or off a supply of current to the motor. A microprocessor can be incorporated to control the motor along with performing other functions in a multi-tasking operating environment, such as a camera or camcorder. The microprocessor is typically interrupted while controlling and operating the motor causing interrupt latency that can be below the precision required by the motor. This interrupt latency can cause oscillations in the motor system that reduced performance, efficiency and caused audible motor/gear noise.

To improve efficiency, reduce oscillations, and reduce noise, pulse width modulation (PWM) circuitries are used in conjunction with the microprocessor to control the power being applied to each motor coil of the motor. With the PWM circuitries, a motor can be configured to micro-step which can demand more usage of the microprocessor. Motor servicing requirements often exceed the interrupt latency of the microprocessor and/or cause the microprocessor to spend considerable time servicing interrupts to change the PWM configurations.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow and sequence diagrams of the systems are provided to explain the manner in which a motor can be controlled by a motor controller.

Figure 1:
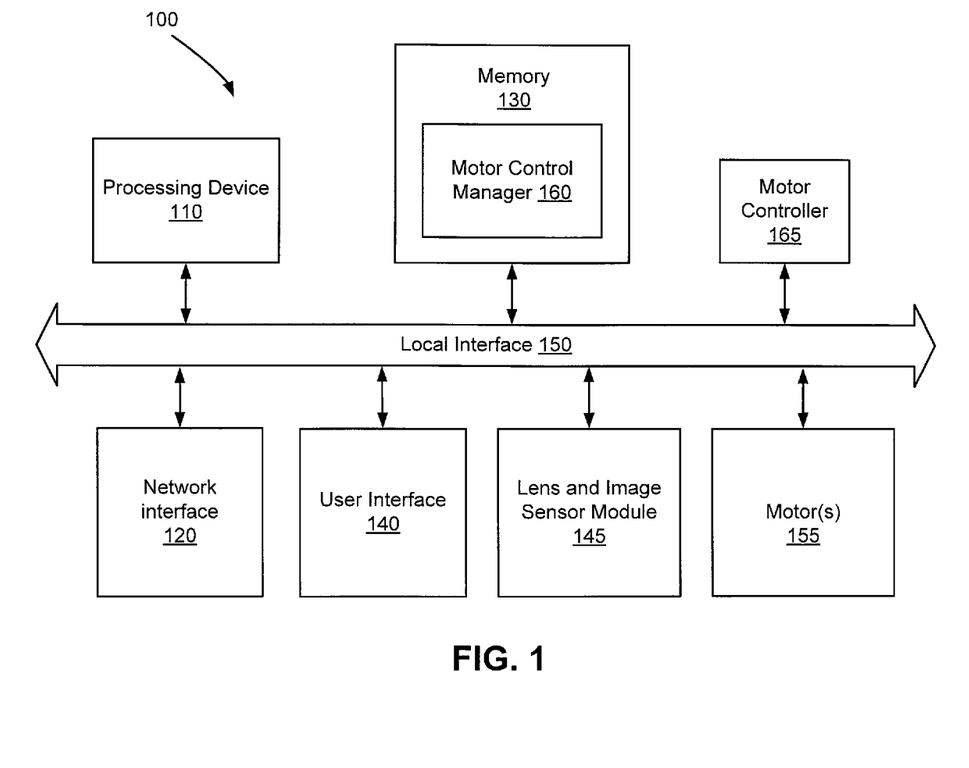
FIG. 1 is a block diagram that illustrates an embodiment of a system in which a motor can be controlled by a motor controller.

FIG. 1 is a block diagram that illustrates an embodiment of a system 100 in which a motor can be controlled by a motor controller. In this example, the system 100 includes components that correspond to a camera or camcorder. In general, the system 100 includes any system that involves controlling the motor by using the motor controller 165 and allowing a multi-tasking general purpose processing device 110 to perform other tasks by removing real time motor control requirements. The motor controller 165 or the processing device 110 includes at least one of the following: micro-processor, macro-processor, micro-controller, application-specific integrated circuit (ASIC), and any hardware controlled motors.

As indicated in FIG. 1, the system 100 comprises a processing device 110, memory 130, one or more user interface devices 140, lens and image sensor module 145, one or more motors 155, motor controller 165, and one or more networking devices 120, each of which is connected to a local interface 150. The local interface 150 can be, for example, but not limited to, one or more buses or other wired or wireless connections, as is known in the art. The local interface 150 may have additional elements, which are omitted for simplicity, such as controllers, buffers (caches), drivers, repeaters, and receivers, to enable communications. Further, the local interface 150 may include address, control, and/or data connections to enable appropriate communications among the aforementioned components.

The processing device 110 can facilitate performing various functions in a multi-tasking operating environment. The functions can include, but are not limited, to red-eye detection, capture color images, display captured images, and other camera functions. The processing device 110 can include any custom made or commercially available processor, a multi-tasking general purpose processor, a central processing unit (CPU) or an auxiliary processor among several processors associated with the system 100, a semiconductor based microprocessor (in the form of a microchip), or a macroprocessor. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The networking devices 120 comprise the various components used to transmit and/or receive data over the network, where provided. By way of example, the networking devices 120 include a device that can communicate both inputs and outputs, for instance, a modulator/demodulator (e.g., modem), a radio frequency (RF) or infrared (IR) transceiver, a telephonic interface, a bridge, a router, as well as a network card, etc. The system 100 can further include one or more I/O devices (not shown) that comprise components used to facilitate connection of the system 100 to other devices and therefore, for instance, comprise one or more serial, parallel, small system interface (SCSI), universal serial bus (USB), or IEEE 1394 (e.g., Firewire™) connection elements.

The lens and image sensor module 145 focuses light to capture an image of a scene and converts the light into electrical signals. The memory 130 can include any one or a combination of volatile memory elements (e.g., random access memory (RAM, such as DRAM, SRAM, etc.)) and nonvolatile memory elements (e.g., ROM, hard drive, tape, CDROM, etc.). The one or more user interface devices comprise those components with which the user (e.g., administrator) can interact with the system 100.

The memory 130 normally comprises various programs (in software and/or firmware) including at least an operating system (O/S) (not shown) and a motor control manager 160. The O/S controls the execution of programs, including the motor control manager 160, and provides scheduling, input-output control, file and data management, memory management, and communication control and related services. The motor control manager 160 facilitates the process for initiating and instructing the motor controller 165 to operate the motor 155 based on sequence information (not shown) stored in memory 130. Operations of the motor control manager 160 are described in relation to FIGS. 4-5.

The motor control manager 160 can be embodied in any computer-readable medium for use by or in connection with any suitable instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

A nonexhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system essentially controls the execution of other computer programs, such as the motor control manager 160, and provides scheduling, input-output control, file and data management, memory management, and communication control and related services.

Figure 2:
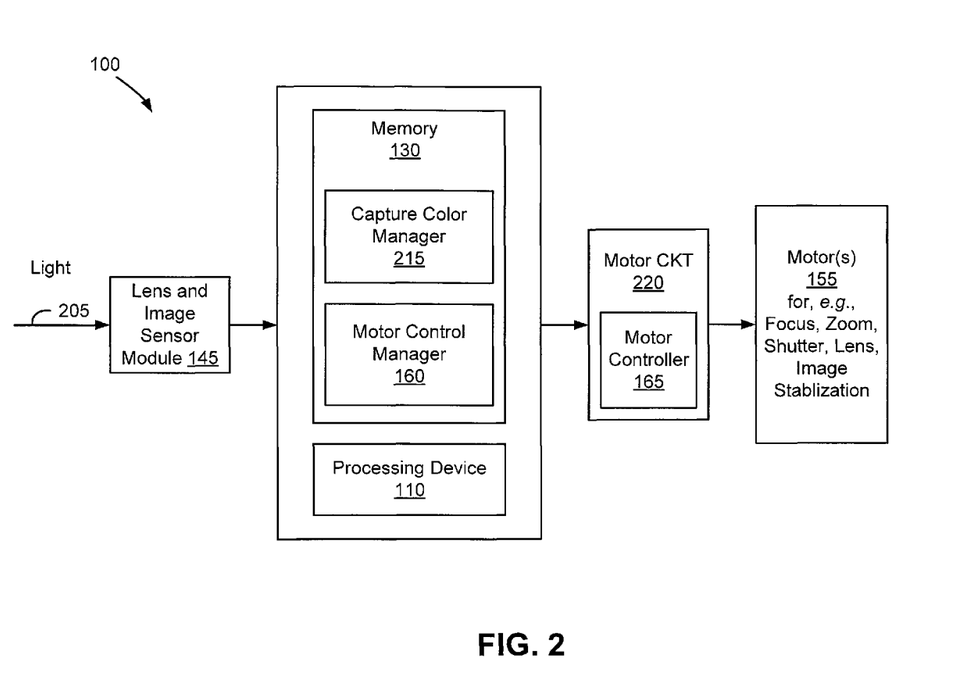
FIG. 2 is a data flow diagram that illustrates an embodiment of the architecture, functionality, and/or operation of the system, such as that shown in FIG. 1.

FIG. 2 is a data flow diagram that illustrates an embodiment of the architecture, functionality, and/or operation of the system 100, such as that shown in FIG. 1. The system 100 in FIG. 2 receives light 205 of an image by way of the lens and image sensor module 145. Such lens and image sensor module 145 is configured to capture light of the image and convert the light into electrical signals. The lens and image sensor module 145 sends the electrical signals associated with the image to a capture color manager 215. The electrical signals are filtered in its three primary colors—red, blue and green—to obtain a full color digital image. The full color digital image is stored in memory 130.

The motor control manager 160 can instruct the processing device 110 to initiate the motor controller 165 of a motor circuitry 220 and instruct the motor controller 165 to operate the motor 155 based on sequence information stored in memory 130. Other functions of the motor control manager 160 are further described in FIGS. 3-5. The motor circuitry 220 is further described in relation to FIG. 3.

Figure 3:
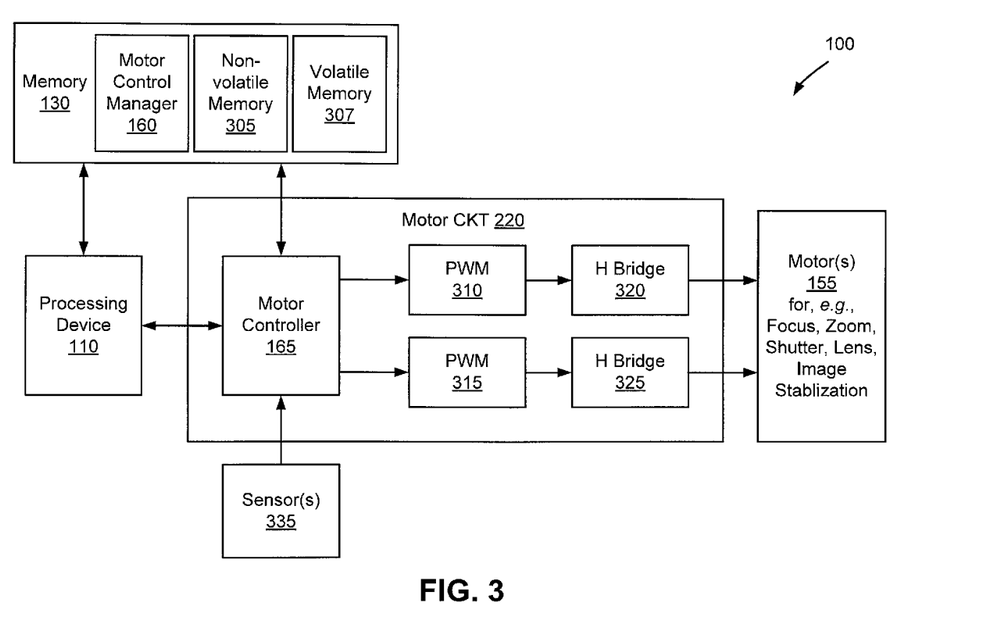
FIG. 3 is a data flow diagram that illustrates an embodiment of the architecture, functionality, and/or operation of the motor circuitry, such as that shown in FIG. 2.

FIG. 3 is a data flow diagram that illustrates an embodiment of the architecture, functionality, and/or operation of the motor circuitry 220, such as that shown in FIG. 2. The memory 130 is configured to store sequence information that can include, but not limited to, control information for pulse width modulation (PWM) circuitries 310, 315. The control information includes a sequence of pre-programmed PWM parameters. Such PWM parameters include, but are not limited to, duty cycle, period, number of periods, duration time, direction, and power.

The sequence information can be initially stored in non-volatile memory 305. The motor control manager 160 can be configured to instruct the processing device 110 to access and transmit the sequence information from the non-volatile memory to the volatile memory 307. Once the motor controller 165 is initiated, the motor controller 165 can access the sequence information in the volatile memory 307 and generate drive signals based on the sequence information. The motor controller 165 transmits the drive signals to the PWM circuitries 310, 315 that receive the transmitted drive signal and generate a modulated signal based on the transmitted drive signal. The transmitted drive signal includes, but is not limited to, at least one of the following parameters: duty cycle, period, number of periods, duration time, direction, and power. The modulated signal is transmitted to an H-bridge that is configured to receive the generated modulated signal and facilitate operating the motor 155.

One or more sensors 335 can detect various conditions of the camera and transmit information related to the various conditions of the camera to the motor controller 165. The sensors 335 include, for example, the lens and image sensor 145 and other sensors that detect an input from a user (e.g., for zooming, capturing an image, etc.). The motor controller 165 can be configured to receive the information from the sensors 335, access the sequence information based on the received information, process the accessed sequence information, and generate a drive signal based on the processed sequence information. In general, by dedicating the motor controller 165 to operate the motor 155, the processing device 110 is removed from real-time requirements; the bandwidth of the processing device 110 required to control the motor 155 is decreased; the motor 155 can be driven with precise, time accurate PWM waveforms; the output jitter of the motor 155 due to interrupt latencies of the processing device 110 can be eliminated; and the motor 155 can operate faster at 2000 pulses per second or more compared to 300 pulses per second.

Figure 4:
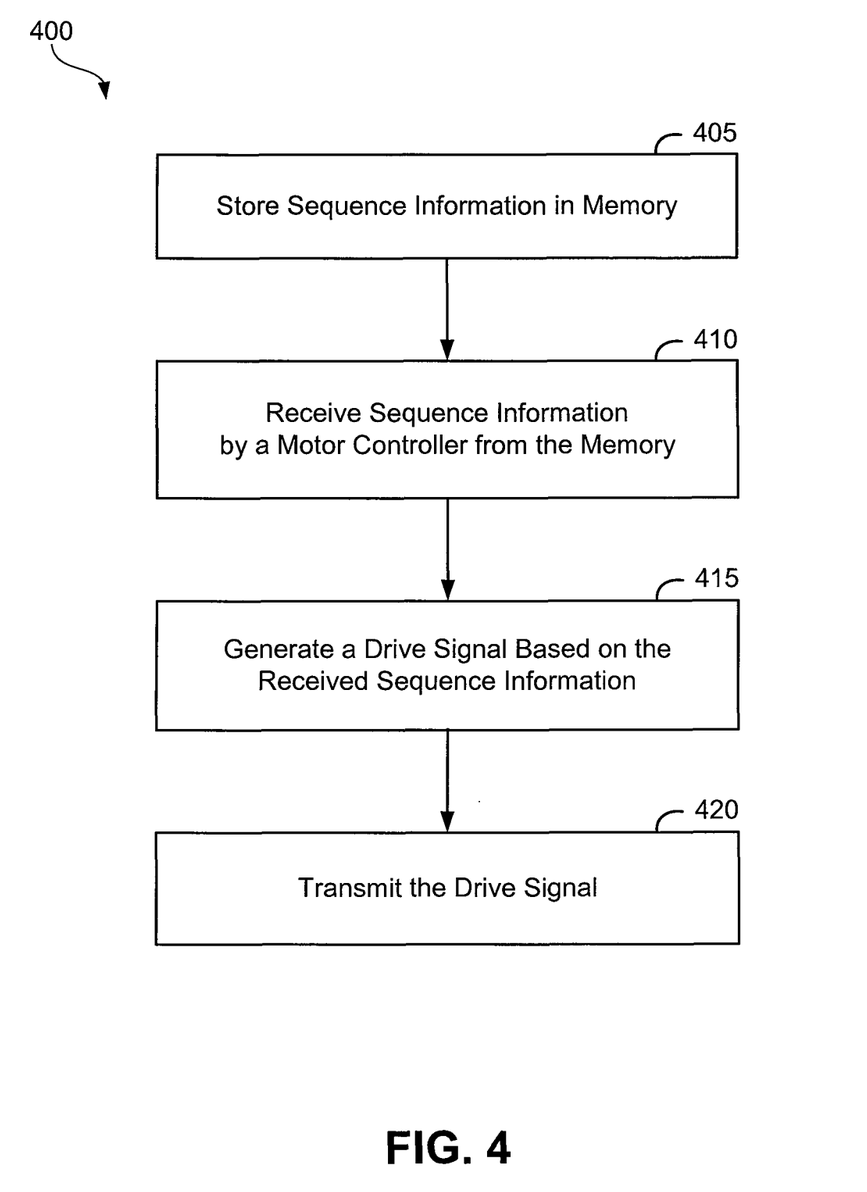
FIG. 4 is a high-level flow diagram that illustrates an embodiment of the architecture, functionality, and/or operation of the system, such as that shown in FIG. 1.

FIG. 4 is a high-level flow diagram that illustrates an embodiment of the architecture, functionality, and/or operation of the motor controller 165, such as that shown in FIG. 1. Beginning with step 405, the method 400 for operating the motor controller 165 (FIG. 1) includes the step of receiving instructions from the processing device 110 (FIG. 1). In steps 410 and 415, the motor controller 165 receives the sequence information from the memory 130 (FIG. 1) based on the received instructions and generates a drive signal based on the received sequence information. In step 420, the motor controller 165 transmits the drive signal.

Figure 5:
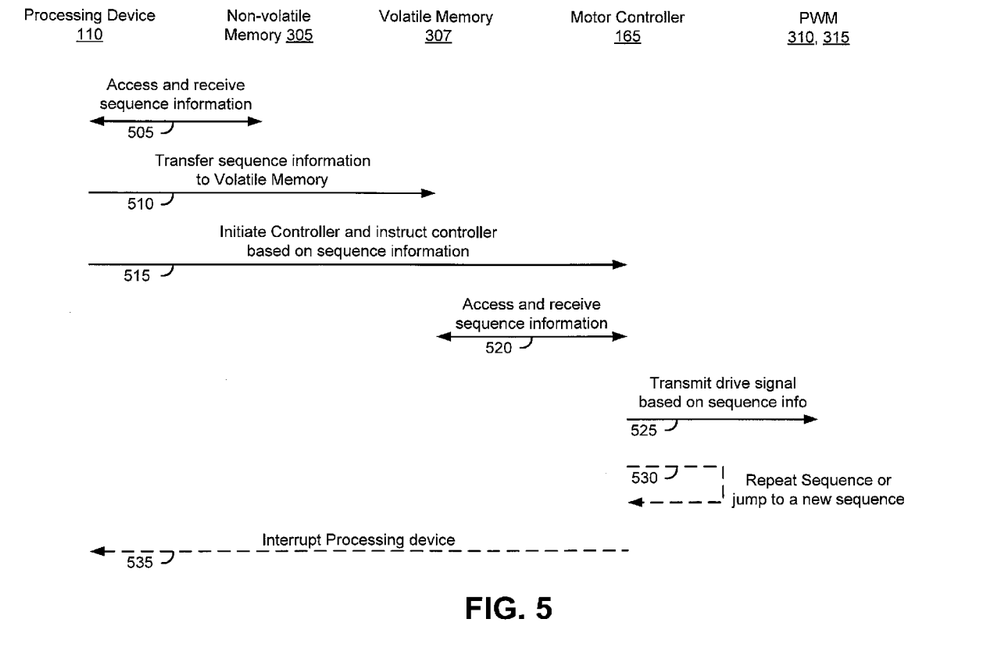
FIG. 5 is a sequence diagram that illustrates an embodiment of the architecture, functionality, and/or operation of the system, such as that shown in FIG. 1.

FIG. 5 is a sequence diagram that illustrates an embodiment of the architecture, functionality, and/or operation of the system, such as that shown in FIG. 1. The motor control manager 160 facilitates initiating and providing instructions to the motor controller via the processing device. Then in step 505, the processing device 110 receives instructions from the motor control manager 160 to access and receive the sequence information from the non-volatile memory 305. In steps 510 and 515, the processing device 110 transfers the sequence information to the volatile memory 307 based on the instructions from the motor control manager 160 and initiates and instructs the motor controller 165 based on the sequence information, respectively. It should be noted that the motor controller 165 can be initiated and instructed based on the instructions from the motor control manager 160. Additionally or alternatively, the sequence information can be initially stored in the volatile memory 307 and the processing device 110 instructs the motor controller 165 to access the sequence information located in the volatile memory 307.

In step 520, the motor controller 165 accesses and receives the sequence information based on the instructions from the processing device 110. The motor controller 165 generates a drive signal based on the received sequence information and transmits the drive signal to the PWM circuitries 310, 315 in step 525. Steps 520 and 525 are repeated until, for example, a sequence corresponding to the sequence information is completed. Alternatively or additionally, in steps 530 and 535, the motor controller 165 automatically repeats a sequence corresponding to the sequence information responsive to the completion of the sequence and interrupts the processing device 110 responsive to at least one of the following: completion of a sequence corresponding to the sequence information and completion of a specified number of tasks in the sequence corresponding to the sequence information, respectively.

Alternatively or additionally, the motor controller 165 is further configured to accomplish at least one of the following: accommodate burst reads from the memory storing the sequence information, count the number of sequences processed based on the received sequence information, automatically jump to processing another sequence upon the completion of a sequence corresponding to the received sequence information, stop processing the received sequence information without an intervention from the processing device 110, and abort processing a sequence corresponding to the received sequence information at any time.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A system comprising:
    memory that is configured to store sequence information, the sequence information comprising a sequence of pre-programmed Pulse Width Modulation (PWM) parameters;
    a motor controller that is configured to:
        receive instructions from a processing device of the system,
        receive the stored sequence information based on the received instructions,
        generate at least one drive signal based on the sequence of pre-programmed PWM parameters included in the received sequence information, and
        transmit the at least one drive signal; and
    a motor that is configured to be operated based on the transmitted drive signal.

2. The system of claim 1, wherein memory includes non-volatile memory and volatile memory, the non-volatile memory being configured to initially store the sequence information, the processing device being configured to access the sequence information from the non-volatile memory and transmit the sequence information to the volatile memory.

3. The system of claim 1, further comprising at least one pulse width modulation circuitry that is configured to receive a transmitted drive signal and generate a modulated signal based on the transmitted drive signal, the transmitted drive signal including at least one of the following parameters: duty cycle, period, number of periods, duration time, direction, and power.

4. The system of claim 3, further comprising an H-bridge that is configured to receive the generated modulated signal and facilitate operating the motor.

5. The system of claim 3, wherein the sequence information includes control information for the at least one pulse width modulation circuitry.

6. The system of claim 1, wherein the memory includes a motor control manager that is configured to facilitate initiating and providing instructions to the motor controller via the processing device.

7. The system of claim 1, wherein the motor controller or the processing device includes at least one of the following: micro-processor, macro-processor, micro-controller, application-specific integrated circuit (ASIC), and any hardware controlled motors.

8. The system of claim 1, wherein the motor controller is configured to interrupt the processing device responsive to at least one of the following: completion of a sequence corresponding to the sequence information and completion of a specified number of tasks in a sequence corresponding to the sequence information.

9. The system of claim 1, wherein the motor controller is further configured to accomplish at least one of the following:
    accommodate burst reads from the memory storing the sequence information,
    count the number of tasks in a sequence processed based on the received sequence information,
    automatically repeat a sequence corresponding to the sequence information responsive to the completion of the sequence,
    automatically jump to processing another sequence upon the completion of a sequence corresponding to the received sequence information,
    stop processing the received sequence information without an intervention from the processing device, and
    abort processing a sequence corresponding to the received sequence information at any time.

10. A method for operating a motor controller, comprising the steps of:
   receiving instructions from a processing device;
   receiving sequence information from memory based on the received instructions, the sequence information comprising a sequence of pre-programmed Pulse Width Modulation (PWM) parameters;
   generating at least one drive signal based on the sequence of pre-programmed PWM parameters included in the received sequence information; and
   transmitting the at least one drive signal.

11. The method of claim 10, further comprising receiving information from the processing device to facilitate initiating the motor controller such that the motor controller is capable of accessing and processing the sequence information.

12. The method of claim 10, further comprising interrupting the processing device responsive to at least one of the following: completion of a sequence corresponding to the sequence information and completion of a specified number of tasks in a sequence corresponding to the sequence information.

13. The method of claim 10, further comprising at least one of the following steps:
   accommodating burst reads from the memory storing the sequence information,
   counting the number of tasks in a sequence processed based on the received sequence information,
   automatically repeating a sequence responsive to the completion of the received sequence information,
   automatically jumping to processing another sequence upon the completion of a sequence corresponding to the received sequence information,
   stopping processing the received sequence information without an intervention from the processing device, and
   aborting processing a sequence corresponding to the received sequence information at any time.

14. A camera comprising:
   memory that is configured to store sequence information, the sequence information comprising a sequence of pre-programmed Pulse Width Modulation (PWM) parameters; and
   a motor controller that is configured to:
      receive instructions from a processing device of the system,
      receive the stored sequence information based on the received instructions,
      generate at least one drive signal based on the sequence of pre-programmed PWM parameters included in the received sequence information, and
      transmit the at least one drive signal; and
   a motor that is configured to be operated based on the transmitted drive signal.

15. The camera of claim 14, wherein memory includes non-volatile memory and volatile memory, the non-volatile memory being configured to initially store the sequence information, the processing device being configured to access the sequence information from the non-volatile memory and sending the sequence information to the volatile memory.

16. The camera of claim 14, further comprising at least one pulse width modulation circuitry that is configured to receive a transmitted drive signal and generate a modulated signal based on the transmitted drive signal, the transmitted drive signal including at least one of the following parameters: duty cycle, period, number of periods, duration time, direction, and power.

17. The camera of claim 16, further comprising an H-bridge that is configured to receive the generated modulated signal and facilitate operating the motor.

18. The camera of claim 14, wherein the motor controller is configured to interrupt the processing device responsive to at least one of the following: completion of a sequence corresponding to the sequence information and completion of a specified number of tasks in a sequence corresponding to the sequence information.

19. The camera of claim 14, wherein the motor controller is further configured to accomplish at least one of the following:
   accommodate burst reads from the memory storing the sequence information,
   count the number of tasks in a sequence processed based on the received sequence information,
   automatically repeat a sequence corresponding to the sequence information responsive to the completion of the sequence,
   automatically jump to processing another sequence upon the completion of a sequence corresponding to the received sequence information,
   stop processing the received sequence information without an intervention from the processing device, and
   abort processing a sequence corresponding to the received sequence information at any time.

20. The camera of claim 14, further comprising at least one sensor that detects various conditions of the camera and sends information related to the various conditions of the camera to the motor controller, the motor controller being configured to:
   receive the information from the at least one sensor,
   access sequence information based on the received information,
   process the accessed sequence information, and
   generate at least one drive signal based on the processed sequence information.

* * * * *

UNITED STATES PATENT AND TRADEMARK OFFICE
CERTIFICATE OF CORRECTION

| | | |
|---|---|---|
| PATENT NO. | : 8,890,457 B2 | Page 1 of 1 |
| APPLICATION NO. | : 12/234345 | |
| DATED | : November 18, 2014 | |
| INVENTOR(S) | : Eric F. Aas et al. | |

It is certified that error appears in the above-identified patent and that said Letters Patent is hereby corrected as shown below:

On the title page, illustrative figure, reference numeral 155, line 7 approx., delete "stablization" and insert -- stabilization --, therefor.

In the Drawings

In sheet 2 of 5, FIG. 2, reference numeral 155, line 7 approx., delete "stablization" and insert -- stabilization --, therefor.

In sheet 3 of 5, FIG. 3, reference numeral 155, line 7 approx., delete "stablization" and insert -- stabilization --, therefor.

Signed and Sealed this
Fifth Day of May, 2015

Michelle K. Lee
*Director of the United States Patent and Trademark Office*